July 18, 1967 J. R. BACON 3,332,067

TUNNEL DIODE ASSOCIATIVE MEMORY

Filed Aug. 19, 1963 4 Sheets-Sheet 1

INVENTOR.
JAMES R. BACON

July 18, 1967 J. R. BACON 3,332,067

TUNNEL DIODE ASSOCIATIVE MEMORY

Filed Aug. 19, 1963 4 Sheets-Sheet 2

INVENTOR.
JAMES R. BACON

| 310 TRUTH TABLE 320 | | |
|---|---|---|
| COMPARE BIT | MEMORY BIT | OUTPUT |
| 0 (Ā) | 0 (B̄) | 0 |
| 1 (A) | 0 (B̄) | 1 |
| 0 (Ā) | 1 (B) | 1 |
| 1 (A) | 1 (B) | 0 |

INVENTOR.
JAMES R. BACON

INVENTOR.
JAMES R. BACON

United States Patent Office 3,332,067

Patented July 18, 1967

3,332,067

TUNNEL DIODE ASSOCIATIVE MEMORY

James R. Bacon, Germantown, Pa., assignor to Burroughs Corporation, Detroit, Mich., a corporation of Michigan Filed Aug. 19, 1963, Ser. No. 303,028
8 Claims. (Cl. 340—172.5)

This invention relates to memory devices and particularly to memory devices of the content addressed or associative type. The present associative memory is a small capacity device having extremely high operational speed and while not restricted to, is especially useful when operated in conjunction with the large capacity, relatively slow speed main memory device usually found in digital computer systems.

It is well known in the digital computer art that the operational speed of any data processing system is greatly dependent on the time required to perform memory processes. Further, it is equally well known that larger capacity memories, while almost always desirable, require longer periods of time to perform a given process.

Much design effort has been expended to achieve an economically feasible storage device having operational speeds approaching the speeds possible by present day electronic circuitry. Additional efforts have been directed toward variations in memory organization.

Usually these large capacity devices used in digital computers are of the word organized, line select type. In these units, a convenient word length is chosen having a given number of binary digits. Each word forms a particular line in the memory and is given a line address. Information is placed in the memory at certain line addresses and when such information is desired it is merely necessary to address the known location and read out the information contained on the addressed line.

Many times, however, the program will require information which is not so straightforwardly satisfied. It may, for example, request all the information contained in the memory which relates to a particular subject without specifying any line address. Another frequent request is whether or not the memory contains certain known information and if it does, to indicate its address.

The satisfaction of these latter requests often imposes extremely lengthy memory manipulations. For example, for the large main memory to determine the existence of a particular word, without being given the line address, requires a series of sequential comparisons. The length of this series if the word is not in the memory, is equal to the number of lines or word locations. Since each of the steps in the series requires a given access time, the total time consumed is equal to the product of the total lines multiplied by the period of one access time.

The associative memory is used to its greatest advantage in these areas of compilations and comparisons.

In an associative memory the determination of the existence of a word is accomplished in one access time. This is achieved by simultaneously addressing every line location in the memory. This method, also has been referred to as content addressing. In fact, associative memories are often referred to as content-addressable or CA memories.

Many variations have been suggested for the design of an associative memory. Since the basic bit storage element of each word is energized directly for writing, identifying and retrieving, the simplest bit storage device may be utilized for the memory; however, this direct activation requires additional logical circuitry associated with each cell. This requirement becomes a significant factor in the memory design and may approach the point where the ratio of logical components to memory components reaches unity. As the logical circuitry is increased, the cost and complexity of the system follow.

The present invention has considerably simplified and reduced the required logic circuitry. In addition, it has achieved all of the advantages of an associative memory and at the same time retained a number of the advantages of the conventionally word organized memory.

There have been prior associative memory devices utilizing tunnel diodes in a matrical form. However, former devices have usually required the utilization of sophisticated circuitry to retrieve the stored information where non-destructive readout was desired. Other devices merely destroyed the information upon reading it out desiring only the speed of one retrieval.

The present device uses an ordinary semiconductor diode in conjunction with a novel technique of interrogation to achieve non-destructive readout very simply.

Briefly then, the present invention is an associative memory device utilizing a tunnel diode as a single bit storage cell. The organization of the memory as to cell selection and information storage is similar to a conventionally organized memory. In this way, information being written into the memory has the location selection advantages of the conventional memory. This means devised for non-destructive readout of the tunnel diode is very simple and troublefree. It is achieved with a single conventional diode which senses the condition of the tunnel diode when the tunnel diode is pulse interrogated. The associative memory features of the device are achieved by incorporating into the memory configuration a complementing scheme which inherently possesses the necessary logical functions usually required in addition to the memory.

It is a primary object of this invention, therefore, to provide an associative memory possessing an operating speed approaching the switching speed of a tunnel diode.

It is also an object of the present invention to provide an associative memory having cell selection capabilities similar to a conventionally word organized memory.

It is still a further object of the present invention to provide an associative memory having non-destructive readout capabilities without additional or complex logical circuitry.

It is still a further object of the present invention to provide an associative memory cell of an extremely basic configuration to thereby reduce complexity and cost.

Other objects and advantages will become apparent when the folowing description is read in conjunction with the accompanying drawings, in which:

FIG. 1 is an overall block diagram of the proposed associative memory.

FIGS. *2a*, *2b* and *2c* represent schematically the basic memory cell in its various operating forms.

Figure 1:
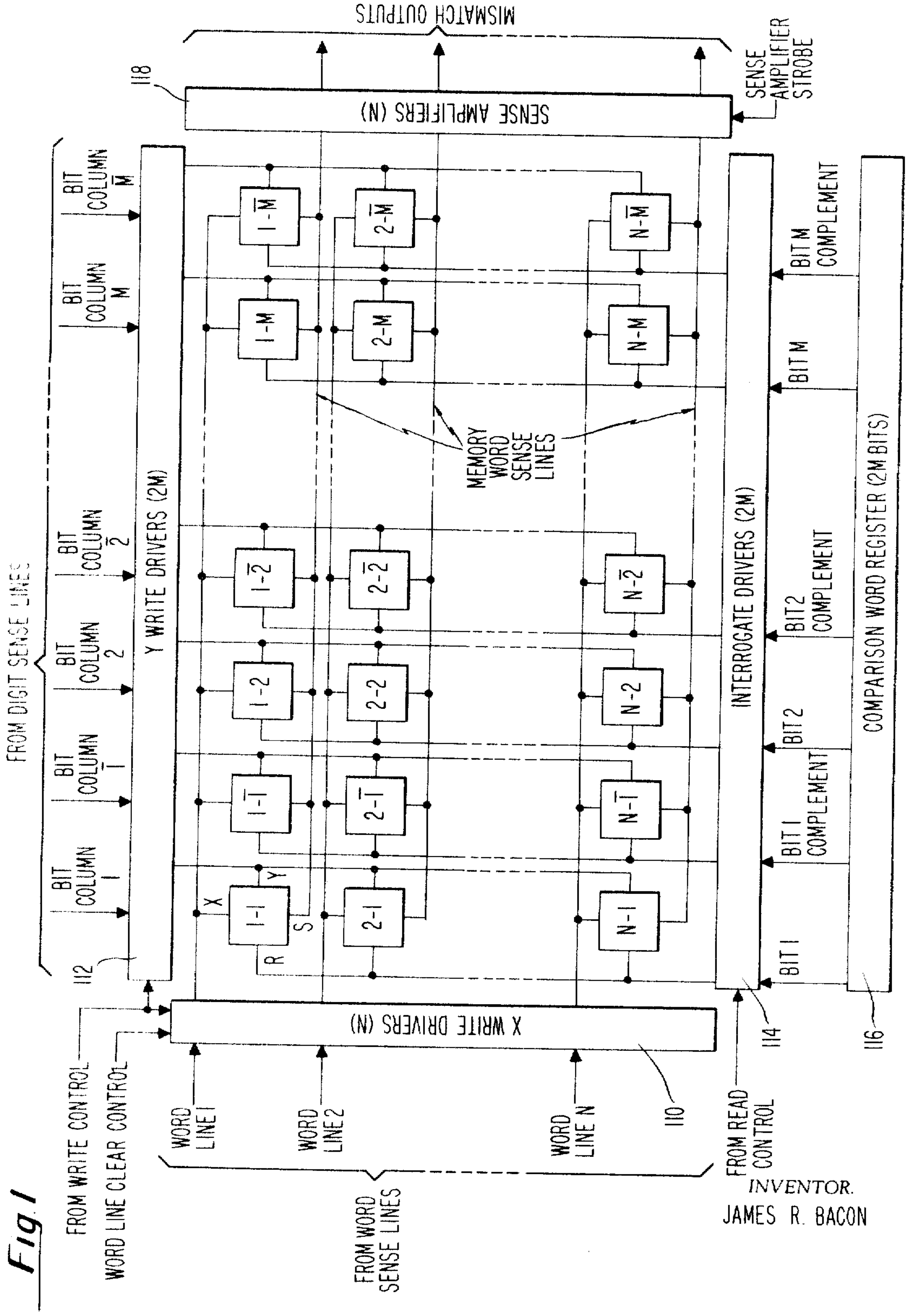

Referring in particular to FIGURE 1, there is shown a block diagram of the overall associative memory plane organization. The X and Y write line drivers 110 and 112 are the selection and information inputs connected to the matrically arranged X and Y lines of the indivdual cells in the memory 1–1 to N–$\overline{M}$. While there are only M information write Y lines, it is desirable as will be explained later, to store the complementing bit of each information bit. The total number of Y write lines is therefore 2M. An information complementing bit is signified by a line over the latter number $\overline{M}$. There is an equal number of bits (2M) stored in comparison word register 116. These are also referred to as interrogate bits, the reason for which will become readily apparent. There is a corresponding group of interrogate line drivers 114 for the comparison word in register 116. A group of sense amplifiers 118 corresponds to the number of sense lines connected to the S terminals of the individual cells 1–1 to N–$\overline{M}$.

An associative memory differs functionally from most other memories. The normal memory is used to store words and to read them out upon command. In the associative memory, the words are stored in the usual manner, but are not read out as words. A comparison word register 116 containing a set of input bits for searching the memory, known as interrogate input bits, accepts a digital word of the same length as the words in memory. A simultaneous comparison is then made between the comparison word and all the words in memory. An output or sense line is associated with each word line in the memory. It indicates by a pulse when the compare word is different from its particular memory word. Each bit of the compare register is wired in common with the corresponding bits of the memory words. The standard comparison logic and its truth table are shown in FIG. 3. It is desired that the complement of the memory word also be stored. To do this, each bit of memory is made to consist of two memory cells. These cells are identical in every way, except for the information contained within them. Cell 1–1 stores the bit of the word, cell 1–$\overline{1}$ stores its complement. In the cell notation (1–1 to N–$\overline{M}$) the first number corresponds to the number of the word, the second number to the cell number. Notice that for every cell a complement cell exists. The present memory consists of 24 bits (48 cells) by eight words. The notation on cell 1–1 for the input lines corresponds to the notation used in FIG. 2. As will be discussed later under the X line driver, a clear operation precedes a write operation. Immediately before a new word is written, one of the X write gates 110 of FIG. 1 for that particular word drops from +2.5 v. to zero v. All of the cells (2M) for that particular word are then set to the low-voltage state of the tunnel diode. The cells which are to be switched are then selected by the X and Y line drivers. The low-voltage state of a cell is called the ZERO state; the high-voltage state is called the ONE state. It can be seen that all of the sense outputs (terminal S of each cell) connect to a common line previously referred to as the sense line. These sense lines in turn each connect to a corresponding one of the sense amplifiers 118, each word having its own sense amplifier in the group 118.

The cells are built into a plane, and all of the lines for the plane are constructed of microstrip. Each of the X line drivers 110 must connect 48 different loads (one load for each cell). The sense lines between the S terminals and the sense amplifiers of 118 are a 100-Ω line terminated at each end in its characteristic impedance. The Y lines and interrogate lines are 25-Ω strip lines.

Figure 2:
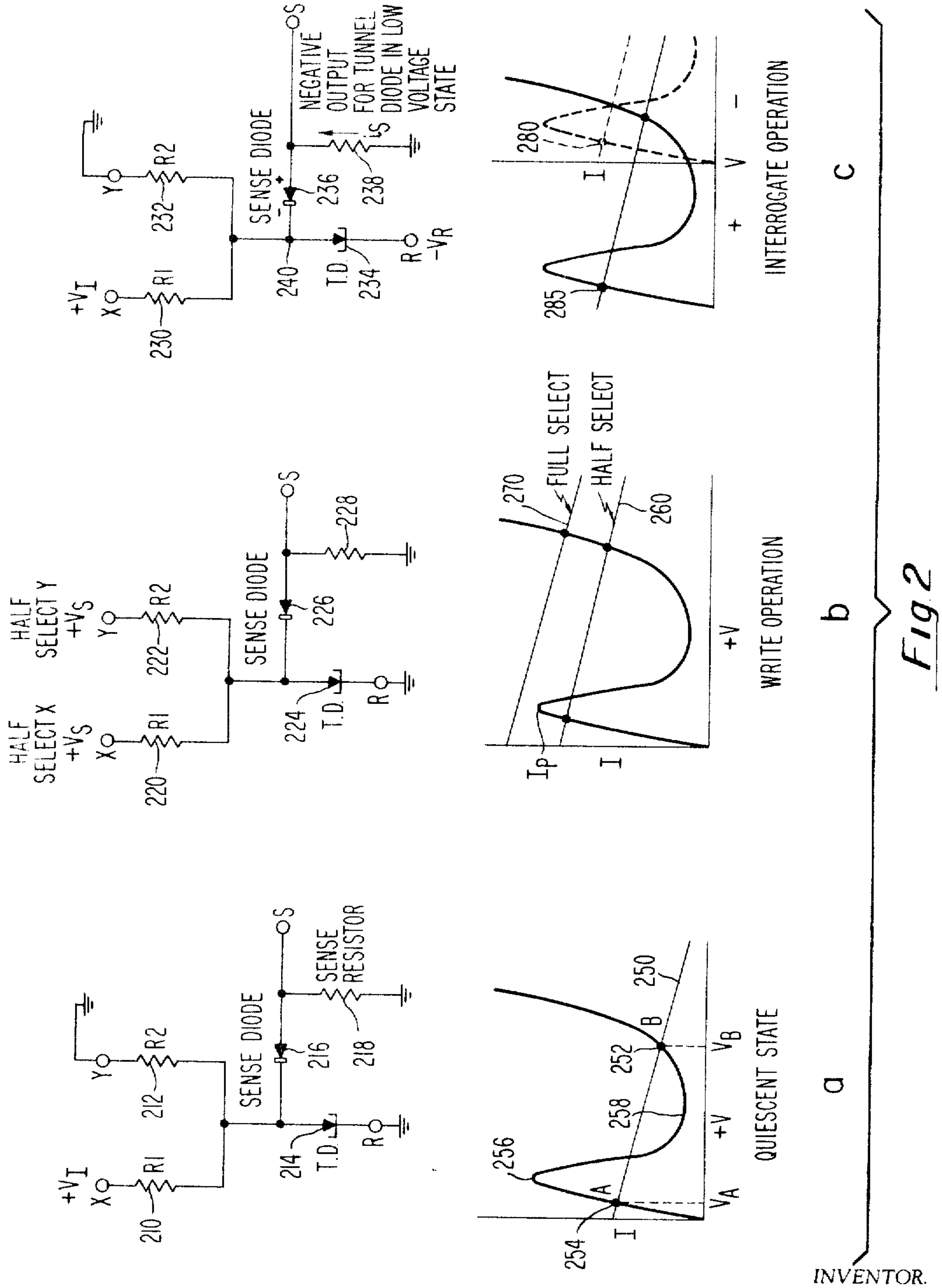
Figure 3:
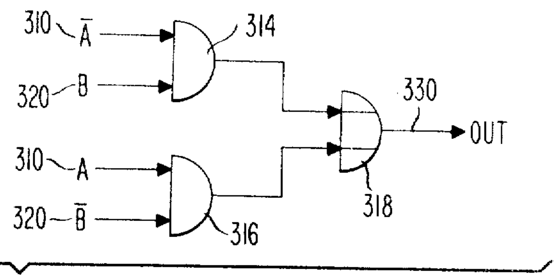
FIG. 3 is a logical truth table for the memory operation.

Refer next to FIGURE 2, which illustrates the tunnel diode cell operation for three conditions.

FIGURES 2*a*, 2*b* and 2*c* schematically show the identical parts. In FIG. 2*a*, the tunnel diode 214 is coupled to the X and Y line terminals through resistors 210 and 212 respectively. The sense diode 216 when caused to conduct draws current through sense resistor 218 to indicate the voltage state of the tunnel diode. The lower portion of FIG. 2*a* shows the characteristic curve of a typical tunnel diode. The load line shown in FIG. 2*a* has been chosen to intersect the characteristic curve at A (254) and B (252). With the load line thus chosen, the diode has two stable operating points. The first of these, at point A, exists where the diode has a forward current of less than $I_p$, 256 and a forward voltage drop $V_A$ of approximately 40 mv. The second operating point B (252) lies on the portion of the characteristic curve which corresponds to the normal diode characteristic curve, and the tunnel diode 214 here has a forward voltage drop $V_B$ of about 0.4 v.

To switch from the stable point A to point B, it is necessary to increase the current in the diode past $I_p$, 256, then to allow it to fall back to some current value greater than $I_V$, 258. To switch back to point A, the current must be decreased to a point below $I_V$, 258, and then returned to a current value of less than $I_p$, 256.

Although this cell of FIG. 2 may be used for a non-associative memory as well, its operation is discussed here as applied to the associative memory. The operation of the cell is best understood by examining separately the three basic operations of store, write and read.

The quiescent or store condition, when no read or write operation is taking place, is shown in FIG. 2*a*. Depending upon previous operations, the voltage across the cell is either $V_A$ or $V_B$. The +2.5 N. source $+V_I$ connected to resistor 210 provides a current which exceeds the valley current 258 for the tunnel diode 214 in either the low ($V_A$) or high ($V_B$) voltage state. The sense diode 216 conducts no current, since the anode of the tunnel diode 214 is positive by an amount of either $V_A$ or $V_B$ thereby back biasing the sense diode. The value of current which flows during the quiescent condition is called the idle current. The cell remains in this state as long as the idle current flows.

The write operation shown in FIG. 2*b* is similar to the write operation of core memories. Two voltages, $+V_S(X)$ and $+V_S(Y)$, neither of which is sufficient to cause the cell to switch, must be present simultaneously to select a particular cell. These voltages are applied to the X and Y terminals of the cell, and cause current to flow to the tunnel diode 224. The lower portion of FIG. 2*b* shows the case of a cell which is half-selected on the X axis 260, as well as the case of a fully selected cell. It should be noted that the voltage on X is the sum of the voltage used to produce the idle current and the voltage to half-select the cell.

From the characteristic curve for FIG. 2*b*, it is seen that during half-select the current is still less than the peak current $I_p$ of the tunnel diode. However, when a cell has been fully selected, the peak current $I_p$ is exceeded, and the tunnel diode 224 switches to the high-voltage state. To return a cell to the low-voltage condition, both X and Y inputs are returned to zero V for a short time. This clear operation is immediately followed by return of the X input to 2.5 v.

The interrogate or read operation is shown in FIG. 2*c*. The X and Y inputs are left in the quiescent condition of FIG. 2*a* during read. The cell lies in either its low-voltage state or its high-voltage state, depending upon previous history. Assuming, first, that the cell is in its low-voltage state, the read input terminal R is now set at $-V_R$ (−0.3 v.). The anode 240 of the tunnel diode 234 follows the read input terminal R negative, and the sense diode 236 is turned on (conducts). Current now flows through the sense-line terminator resistor 238, causing the sense terminals of the cell to become negative. However, if the tunnel diode 234 is initially in its high-voltage state, the anode 240 of the tunnel diode changes from +0.4 v. to +0.1 v. as the read input terminal R changes from 0 v. to −0.3 v. Since the anode 240 of the tunnel diode 234 does not swing negative, the sense diode 236 conducts no current through the sense-line terminating resistor 238. The sense outputs of the cell thus remain at ground potential.

FIGURE 3 illustrates the standard logic required to accomplish the necessary comparison result desired of the memory. The truth table 300 indicates a compare bit column 310, a memory bit column 320 and a resulting output column 330. If any horizontal combination of the compare and memory columns is chosen as the input information to the logic circuitry AND gates 314 and 316, there will result an output signal 330 from OR gate 318.

It should be noted that an output signal 330 is only possible where the input signals 310 and 320 are not matched, in other words if they are mismatched. It is this logical result which is achieved by the present invention without the additional indicated logical circuitry.

Figure 4A:
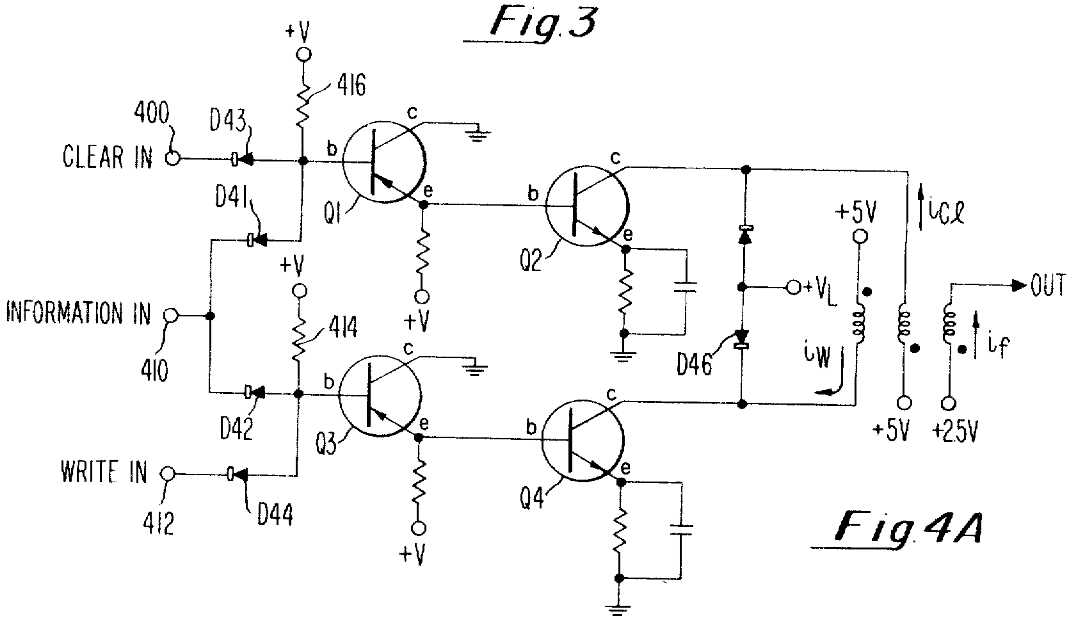
FIGS. 4A and 4B are the schematic and output waveforms of one of the X lines drivers for the memory matrix.
Figure 4B:
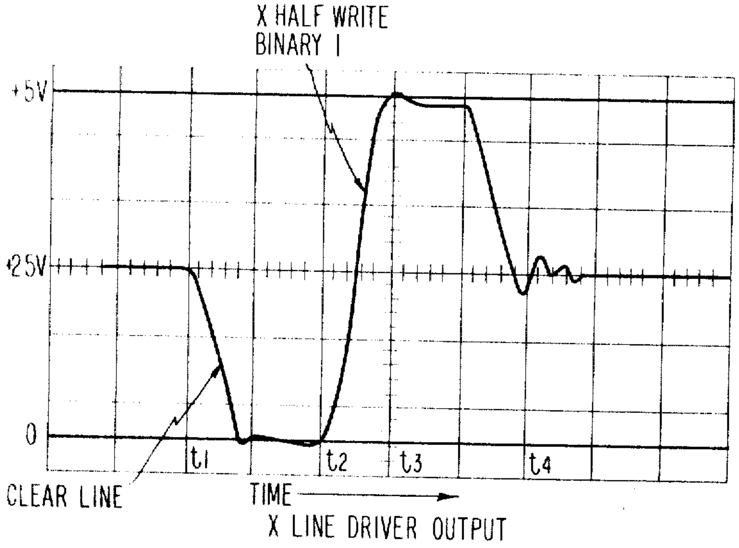

The X line driver schematically shown in FIG. 4*a* must be capable of providing a pulse doublet as shown in FIG. 4B. The first part of this doublet allows the clear operation to take place, while the second part of the doublet selects the word along the X axis.

The line which the X driver must drive is a microstrip line having 48 resistors, each of 1.2KΩ. The line is terminated at the far end with 100Ω. Thus, the X driver sees 20Ω at its output.

Referring to FIG. 4A, the clear input 400 is ANDed with the information line by diodes D43 and D41 which selects the location in which a word is to be written. The output of this AND gate is buffered by transistor Q1, and is used to turn on transistor Q2. This causes current $i_{C1}$ to flow and the voltage on the output (OUT) to be changed from +2.5 v. to zero v. for the clear operation. Transistor Q2 does not bottom, to avoid storage effects. The write input 412 is now ANDed with the information input by diodes D44 and D42 and a similar operation takes place at transistors Q3 and Q4. The collector winding illustrating current *iw* is of opposite polarity, causing the output signal to be driven back to its original state. The clear and X write pulses as shown in FIG. 4B are timed to follow each other immediately. Each pulse is of 25-ns. duration. The rise time of the output waveform is approximately 8 ns.

Figure 5B:
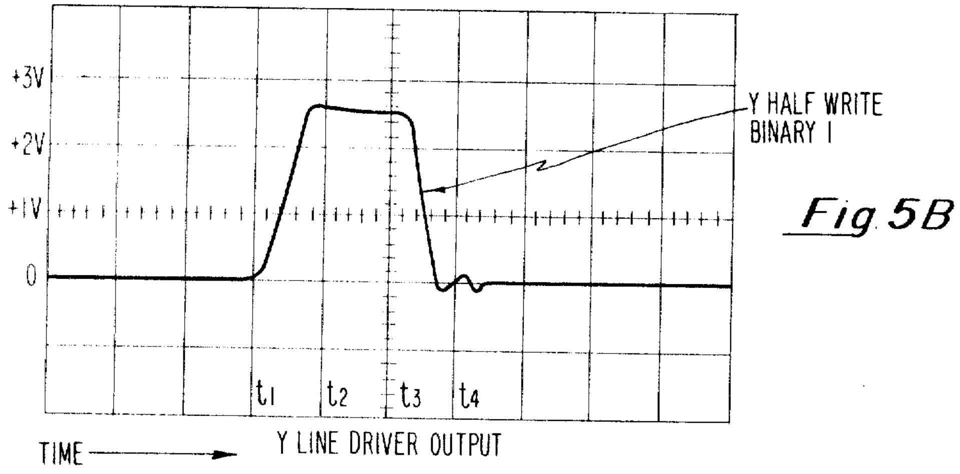
FIGS. 5A and 5B are the schematic and output waveform of one of the Y line drivers for the memory matrix.
Figures 5A, 6A:
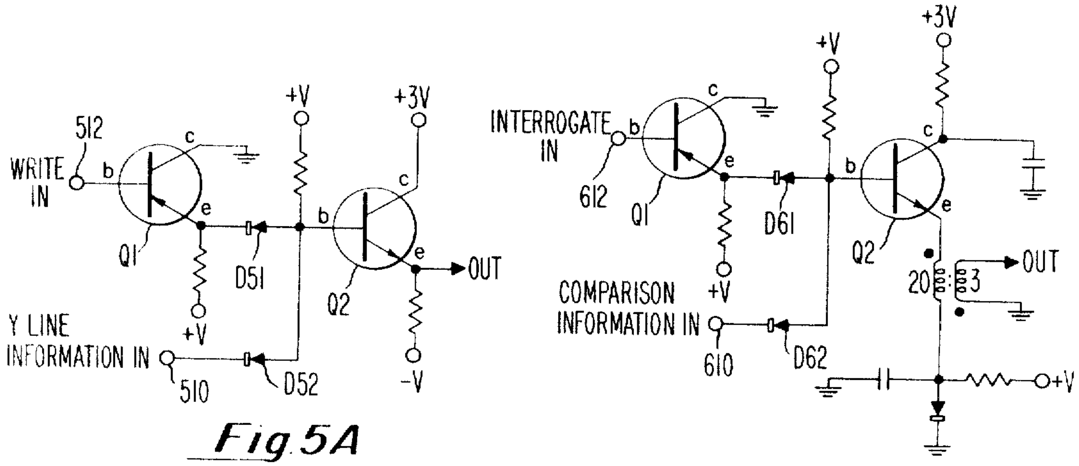
FIGS. 6A and 6B are the schematic and output waveform of one of the comparison interrogation drivers of the memory.

The Y line driver is less complex since it need not produce a pulse doublet. The output of this driver is a pulse from zero to +2.5 v., shown in FIG. 5B. The schematic is shown in FIG. 5A.

This line driver has a transistor buffer on the input 512 for the write command, since there are 48 of these circuits driven in parallel for a 24-bit word. The Y line information input 510 is ANDed with the output of this transistor buffer (Q1) by diodes D52 and D51. This waveform is applied to the base *b* of transistor Q2, which output at emitter *e* is then used to drive the line. Reference to FIG. 5B will show that rise time of approximately 5 ns. is obtained. The Y write command is simultaneously timed with the write input to the X line driver of FIG. 4B. Therefore the two half-select positive pulses coincide for a full write operation.

The interrogate or read line driver must provide a pulse of zero to −0.3 v. A schematic of the driver is shown in FIG. 6A.

Figure 6B:
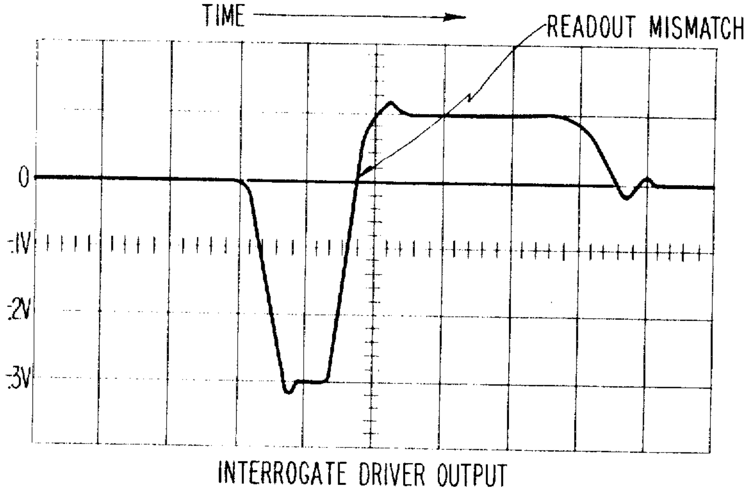

The interrogate line 612 driver is buffered by transistor Q1 in the same manner as the Y line driver, since 48 interrogate drivers must be driven in parallel. The output of this buffer driver *e* of Q1 is ANDed with the comparison information line 610 from the register, which holds the word to be compared against, by diodes D61 and D62. The AND gate is then connected to the base *b* of a driver transistor Q2 which provides the pulse to a transformer in its emitter *e* having a 20:3 ratio. The output waveform is shown in FIG. 6B. This pulse will cause the readout of any cell containing a mismatch. The transformer provides the necessary inversion for the pulse. The reset of the transformer causes the output to go positive after the read pulse. The amount, however, is not sufficient to be troublesome to cell operation.

It is to be understood here that the reason the complement of each stored bit is necessary as well as the complement of the interrogate bits is the fact that only binary 1 interrogate bits activate the memory cells and only activated memory cells containing binary 0 information are capable of activating the sense diode to thereby indicate a mismatch. Consequently, a binary zero interrogate bit, although not corresponding to a stored binary 1 would be incapable of activating the sense line to indicate the mismatch.

Further, it should be noted that the associative memory organization described may be considered to be created by two matrices. Thus, the four terminals of each cell, namely X, Y, R and S may be considered as being connected by a first and a second set of X–Y lines. The X and Y terminals of each cell connected, of course, to the X and Y lines so named and referred to as the first matrix. The second X–Y matrix being connected to the R and S terminals of each cell and being so named and referred to as R (read or interrogate) and S (sense) lines in order to avoid the confusion of a second set of X–Y lines.

While there have been shown, described and pointed out the novel features of the invention as applied to the preferred embodiment it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An associative memory plane comprising a first and a second matrix and a plurality of one bit storage devices, said first matrix having a plurality of X lines intersecting a plurality of Y lines at each intersection of which is coupled one end of a one bit storage device, said X and Y lines of said first matrix being capable of selectively imparting information to said storage devices, said second matrix having an equal plurality of corresponding X and Y intersecting lines, each of said X lines of said second matrix coupled to the plurality of corresponding Y line intersections of said first matrix through a plurality of information sensing diodes and each of said Y lines of the second matrix connected to the opposite ends of said one bit storage devices, whereby information stored in said memory plane by said first matrix may be simultaneously compared with information imposed on said Y lines of said second matrix, the result of said comparison being indicated on the X lines of said second matrix.

2. The memory plane as set forth in claim 1 wherein the imposition of a negative voltage level on the Y lines of said second matrix causes conduction of any diode sensing device on the X lines of said second matrix connected to a tunnel diode in its low voltage, high current state, thereby indicating in said X lines a binary mismatch between the stored information of the low voltage level tunnel diode and the imposed negative voltage on the Y lines of the second matrix without destruction of the stored information in said tunnel diodes.

3. A tunnel diode associative memory plane comprising a memory matrix of X and Y lines at each intersection of which each of said lines is connected through a separate impedance to the common connection of a tunnel diode storage device with a comparison sensing means, the sensing means of all Y line intersections with a single X line thereafter connected together to a common sense line, there being a common sense line associated with each of said X lines, said memory plane further comprising a comparison interrogation activating means including a plurality of interrogating activating bits equal in number and individually corresponding to one of said Y lines whereby said Y lines are activated by said interrogating bits to simultaneously compare the plurality of activating bits with each plurality of bits contained in said tunnel diode storage devices at all of the Y line intersections with a single X line and to simultaneously provide on the common sense line associated with each of said X lines the results of said comparison interrogation.

4. A storage cell for an associative memory plane comprising a first and second impedance connecting sources of selection and storage information to a common juncture, a source of information requests for comparison with said stored information, a tunnel diode utilized as a storage device connected between said common juncture and said source of information requests and a comparison sensing means connected to said common juncture to automatically indicate the occurrence of a mismatch between said stored and said requested information.

5. The storage cell as set forth in claim 4 wherein said comparison sensing means includes a diode.

6. The storage cell as set forth in claim 4 wherein said automatic mismatch indication is initiated by the application of the requested information to said storage cell.

7. The storage cell as set forth in claim 4 wherein said automatic mismatch indication is initiated by the application of a binary 1 information request signal to a storage cell containing a binary 0 storage information signal.

8. A storage unit including two storage cells as defined in claim 4, said unit serving for use in a two cell per bit associative memory plane, connected in complementary manner so that the storage information contained in one of said cells is the binary complement of the storage information contained in the other of said cells and the information requested of said one cell is complementary to the requests made of said other cell.

References Cited

UNITED STATES PATENTS

| | | | |
|---|---|---|---|
| 2,973,508 | 2/1961 | Chadurjian | 340—174 |
| 3,197,653 | 7/1965 | Anderson | 307—88.5 |
| 3,221,180 | 11/1965 | Kaufman | 307—88.5 |

FOREIGN PATENTS

| | | |
|---|---|---|
| 1,307,396 | 9/1962 | France. |

OTHER REFERENCES

September 1960—Non-Destructive Readout for Tunnel Diode Memory, A. S. Myers, Jr., IBM Technical Disclosure Bulletin, vol. 3, No. 4.

P. 1440, September 1961—A Bistable Flip-Flop Circuit Using Tunnel Diode, V. Uzunoglu, Proceedings of the IRE.

September, 1961—Non-Destructive Memory Cells Amodei and Kosonocky, RCA Technical Notes.

Pages 23–28, February 1962—A Tunnel-Diode-Tunnel Rectifier in Manosecond Memory, Kaufman, Solid State Design.

ROBERT C. BAILEY, *Primary Examiner.*

I. S. KAVRUKOV, *Assistant Examiner.*